United States Patent [19]

Murakami

[11] Patent Number: 6,088,719
[45] Date of Patent: Jul. 11, 2000

[54] COMMUNICATION APPARATUS AND COMMUNICATION PROGRAM STORAGE MEDIUM

[75] Inventor: Masahiko Murakami, Kawasaki, Japan

[73] Assignee: Fujitsu Limited, Kawasaki, Japan

[21] Appl. No.: 09/121,524

[22] Filed: Jul. 23, 1998

[30] Foreign Application Priority Data

Sep. 19, 1997 [JP] Japan .................................. 9-255498

[51] Int. Cl.[7] .................................................. G06F 13/00
[52] U.S. Cl. .......................................................... 709/204
[58] Field of Search ...................... 364/DIG. 1 MS File, 364/DIG. 2 MS File; 709/200, 204, 206, 207, 217

[56] References Cited

U.S. PATENT DOCUMENTS 5,793,365  8/1998  Tang et al. .............................. 345/329
5,828,839  10/1998  Moncreiff ............................... 709/204
5,956,491  9/1999  Marks ..................................... 709/250

FOREIGN PATENT DOCUMENTS 10-154117  6/1998  Japan .

*Primary Examiner*—Robert B. Harrell
*Attorney, Agent, or Firm*—Staas & Halsey LLP

[57] ABSTRACT

There are provided a communication apparatus connected via a network to another communication apparatus, and a communication program storage medium incorporated into a computer system. The communication program storage medium stores therein a communication program for causing the computer system to operate as the communication apparatus. States, final statement times and final statement contents of users, which are extracted from statement contents on the respective users, are recorded and displayed. This feature makes it possible to contribute to effective utilization for information on the network.

19 Claims, 13 Drawing Sheets

COMMUNICATION APPARATUS AND COMMUNICATION PROGRAM STORAGE MEDIUM

BACKGROUND OF THE INVENTION

1. Field of the Invention

The present invention relates to a communication apparatus connected through a network to at least one another communication apparatus, in which character messages transmitted from other communication apparatuses are received and displayed, and character messages are inputted and transmitted to other communication apparatuses, and a communication program storage medium incorporated into a computer system, which stores therein a communication program for causing the computer system to operate as the above-mentioned communication apparatus.

2. Description of the Related Art

Hitherto, a computer contributes to a supplement to a personal ability, such as a calculation, a document editing, etc. On the other hand, recently, a processing ability of the computer is improved and a network comes into wide use as seen in the recent internet boom, and thus there is raised such a need that a computer is used to support a group work.

One of the most important things, when a group work is performed, is to contribute to smoothing of understanding each other among groups. Hitherto, contributing to smoothing of understanding each other is implemented in the form of an electronic mail system, NetNews and the like. However, in future, it seems that there will be important understanding each other according to a so-called chat system that a plurality of user terminals are always connected to a network so that the users can always interchange messages through the network. A merit of the chat system resides in the point that messages can be interchanged readily with conversation languages, while it is performed on a character basis. Thus, as compared with an environment involved in only a mail and news, it is possible to greatly contribute to smoothing of understanding each other.

According to the above-mentioned chat system, however, even if messages, which include information of the states of users, for example, "I leave my seat for a conference", "I will go to a library", etc., are fed onto a network constructing the chat system, those messages would be carried away with the passage of time together with other messages, and thus the user information would be lost. Accordingly, while adoption of the chat system may contribute to smoothing of understanding each other, there is associated with such a problem that a lot of information is not always effectively utilized.

SUMMARY OF THE INVENTION

In view of the foregoing, it is therefore an object of the present invention to provide a communication apparatus suitable for constructing a chat system capable of contributing to effective utilization of information flowing through a network, and a communication program storage medium which stores therein a communication program suitable for causing a computer system to operate as the communication apparatus constructing the chat system.

To attain the above-mentioned object, according to a first communication apparatus of communication apparatuses of the present invention, there is provided a communication apparatus connected via a network to at least one another communication apparatus, in which a character message transmitted from another communication apparatus is received and displayed, and a character message is inputted and transmitted to another communication apparatus, said communication apparatus comprising:

a final statement time storage unit for storing a final statement time list in which received times of character messages, each being finally transmitted from an associated another communication apparatus, are associated with other communication apparatuses, respectively;

received time obtaining means for obtaining received time of the character message transmitted from another communication apparatus; and final statement time registering means responsive to a reception of a character message for rewriting a time on the final statement time list stored in said final statement time storage unit, the time being associated with another communication apparatus as an originator who issues the character message, into the received time of the character message obtained by said received time obtaining means.

In a constant connection type of chat system in which communication lines are always connected with each other so as to interchange character messages (that is, interact with one another), it happens that when a character message is transmitted from the other party to one (that is, when the other party speaks to one), the one cannot always confirm the character message (talk) of the other party at once, and a response message to the received message is intended to be transmitted later. In such a situation, in some case, there is a need to know a time of receipt of the message transmitted from the other party. For example, if a response message is transmitted immediately after receipt of the message from the other party, it is expected that the other party may immediately confirm the response message. Further, in the event that a response message is transmitted later for long time after receipt of the message from the other party, it is expected that the other party may leave his seat before the associated communication apparatus, alternatively it happens in some case concerned with contents of the message of the other party that the response itself becomes useless.

In view of the foregoing, according to the first communication apparatus, there is always provided the final statement time list, and thus it is possible to see a time of receipt of the final message from the other party and thereby perform a suitable processing to the received message.

In the first communication apparatus, it is preferable that the communication apparatus further comprises final statement time display means for displaying the final statement time list stored in said final statement time storage unit. In this case, it is preferable that the communication apparatus further comprises time elapsed arithmetic means for calculating times elapsed starting from times on the final statement time list stored in said final statement time storage unit up to present time, respectively, wherein said final statement time display means displays display columns for respective communication apparatuses on the final statement time list in accordance with a display format according to time elapsed starting from time displayed on the associated display column up to present time.

Displaying the final statement times in the form of list makes it possible to readily see the states of communications with a plurality of communication destinations. And in this case, displaying the final statement times, for example, with color identification for each time elapsed makes it possible to more readily grasp the time elapsed for each communication destination.

To attain the above-mentioned object, according to a second communication apparatus of communication apparatuses of the present invention, there is provided a communication apparatus connected via a network to at least one another communication apparatus, in which a character message transmitted from another communication apparatus is received and displayed, and a character message is inputted and transmitted to another communication apparatus, said communication apparatus comprising:

a final statement content storage unit for storing a final statement content list in which whole or part of character messages, each being finally transmitted from an associated another communication apparatus, are associated with other communication apparatuses, respectively; and final statement content registering means responsive to a reception of a character message for rewriting a character message on the final statement content list stored in said final statement content storage unit, the character message being associated with another communication apparatus as an originator who issues the character message, into whole or part of the newly received character message.

In the event that an interaction is performed through a constant connection type of chat system, the other party of interaction is not always a single and it happens that conversations or interactions with a plurality of other parties are simultaneously proceeded with. In such a situation, usually, messages are displayed in the order of receipt of the messages no matter which other party of communication transmits the message. This brings about such a fear that it becomes difficult to readily grasp the progress of conversation with the other party of communication concerned with a break for a long time.

In view of the foregoing, according to the second communication apparatus of the present invention, the final messages of the respective communication destinations are recorded. This feature makes it possible to readily grasp the progress of conversation with the other party of communication.

In the second communication apparatus of the present invention, it is preferable that the communication apparatus further comprises final statement content display means for displaying the final statement content list stored in said final statement content storage unit.

Displaying the final statement content with the respective other party of communication in the form of list makes it possible to readily grasp the progress of conversation as to all of the other parties of communication.

To attain the above-mentioned object, according to a third communication apparatus of communication apparatuses of the present invention, there is provided a communication apparatus connected via a network to at least one another communication apparatus, in which a character message transmitted from another communication apparatus is received and displayed, and a character message is inputted and transmitted to another communication apparatus, said communication apparatus comprising:

a user state storage unit for storing a user state list in which states of a user as an operator of the communication apparatus are associated with other communication apparatuses, respectively;

user state retrieval means for retrieving characters or a character train representative of a state of the user from the received character message; and user state registering means responsive to a detection of characters or a character train representative of a state of the user by said user state retrieval means for rewriting a state of the user on the user state list stored in said user state storage unit, the state of the user being associated with another communication apparatus as an originator who issues the character message, into the state of the user represented by the characters or the character train detected by a retrieval of said user state retrieval means.

In some case, a message transmitted from the other party (user) of communication may include characters or a character train representative of the state of the other party of communication. For example, in the event that the message issued from the user includes characters or a character train such as "I will leave my seat", it means that the other party of user will take a state of "Leaving one's seat" in which the other party of user will leave the associated communication apparatus for some time. In the event that the message issued from the user includes characters or a character train such as "I will go to a hospital", it means that the other party of user will take a state of "Movement" which indicates that whereabouts of the user is "hospital". In the event that the message issued from the user includes characters or a character train such as "I return", it means that the other party of user takes a state of "Taking one's seat". In the event that the message issued from the user includes characters or a character train such as "Go back", or "I will go home", it means that the other party of user will take a state of "Going home".

According to the third communication apparatus, characters or a character train representative of states of the other party (user) of communication are retrieved from the character message transmitted from the other party (user) of communication, and the user state list is prepared. This feature makes it possible to see the state of the other party of communication and thereby avoiding such an inconvenience that urgent messages are transmitted to the other party who is absent.

In the third communication apparatus, it is preferable that the communication apparatus further comprises user state list display means for displaying the user state list stored in said user state storage unit.

Displaying the states of a plurality of communication destinations in the form of list makes it possible to readily see the states of the plurality of communication destinations.

In the third communication apparatus, it is preferable that the communication apparatus further comprises a user state index character storage unit for storing characters or a character train representative of a state of the user in association with the state of the user, wherein said user state retrieval means retrieves characters or a character train, which are identical with the characters or the character train stored in said user state index character storage unit, from the received character message. In this case, it is preferable that the communication apparatus further comprises: user state index character input means for inputting characters or a character train associated with states of the user; and user state index character registering means for registering the characters or the character train inputted through said user state index character input means on said user state index character storage unit in association with the state of the user.

In the event that characters or a character train, which are indexes for the state of the user (communication destination), are retrieved, there is a need to determine beforehand a correspondence between characters or a character train and user states. Here, such a correspondence relation is stored in the user state index character storage unit. Permission of registration of characters or a character train involved in the correspondence relation makes it possible to increase the vocabulary of characters or a character train, which are indexes for the state of the user, and also to change those to the vocabulary suitable for the communication party.

In the third communication apparatus, it is preferable that said user state registering means serves, with respect to a predetermined first state of a plurality of types of states which may be registered on said user state list, to be responsive to receipt of a character message, but with omission of the retrieval of said user state retrieval means, and to rewrite a state of the user on the user state list stored in said user state storage unit, the state of the user being associated with another communication apparatus as an originator who issues the character message, into a predetermined second state different from the predetermined first state.

In the event that the user (communication destination), who was in the state of, for example, "Leaving one's seat" or "Going home", transmits a message, it is acceptable that the state of "Leaving one's seat" or "Going home" is released upon receipt of the message transmitted, but without retrieving the specific characters or character trains from the message transmitted, and it is decided that the state of the user of interest shifts to the state of "Taking one's seat". In this manner, in some case concerning with the state of the user, it is acceptable that the state of the user who transmits the message, on the user state list is rewritten upon receipt of the message transmitted, but without retrieving the specific characters or character trains.

Further, in the third communication apparatus, it is preferable that in a case where as one of states of the user includes a movement state in which a user designates a place located apart from an installation place of a communication apparatus associated with the user, and the communication apparatus incorporates thereinto a bulletin board software for posting a notice of whereabouts of a plurality of users, the communication apparatus further comprises bulletin board rewriting means for registering with the bulletin board software, when said user state retrieval means retrieves characters or a character train representative of whereabouts from the received character message, whereabouts of another communication apparatus as an originator who issues the character message, which is indicated by the retrieved characters or the character train.

There comes on the market a whereabouts bulletin board software in which whereabouts are rewritably registered and the whereabouts are displayed on the display screen. In the event that such a whereabouts bulletin board software is incorporated into the communication apparatus, when the user state, particularly the state of "Movement" is detected from the message, it is preferable that the whereabouts is registered with the whereabouts bulletin board software. This feature makes it possible to save one trouble that the user's whereabouts is transferred to the whereabouts bulletin board software.

Furthermore, in the third communication apparatus, it is preferable that the communication apparatus further comprises:

taking one's seat confirmation retrieval means for retrieving whether a character message to be transmitted to another communication apparatus includes characters or a character train for confirming taking one's seat, the characters or the character message being useful to confirm that a user of said another communication apparatus is in a state of taking one's seat such that the user can operate said another communication apparatus; and communication destination state display means for displaying, when said taking one's seat confirmation retrieval means detects the characters or the character train for confirming taking one's seat in the character message to be transmitted to the another communication apparatus, a state of the user of the another communication apparatus in the user state list stored in said user state storage unit.

In the event that the presence of the other party is confirmed in such a way that the name 'xxx' of the other party is raised to give a question that "is 'xxx' in ?", without confirming the state of the communication destination in the user state list, taking out and displaying the state of the communication destination from the user state list makes it possible to see the state of the communication destination without waiting for a long time, and also without opening the user state list by oneself.

In this case, it is preferable that the communication apparatus further comprises:

timer means for counting a time elapsed since a character message including characters or a character train for confirming taking one's seat is transmitted to another communication apparatus, wherein said communication destination state display means for displaying, when said communication apparatus does not yet receive a response message from said another communication apparatus at a time point that the time elapsed counted by said timer means reaches a predetermined waiting time, the state of the user of the another communication apparatus.

In some case, it will be troublesome that after confirmation of the presence of the other party of user the user state is immediately displayed, and it is desirable that the state of the party of communication is displayed after a while (a predetermined waiting time).

In this case, it is preferable that the communication apparatus further comprises waiting time set up means for setting up said predetermined waiting time.

With respect to the waiting time, it is preferable that the user optionally set up a desired time.

Further, it is preferable that the communication apparatus further comprises:

a final statement content storage unit for storing a final statement content list in which whole or part of character messages, each being finally transmitted from an associated another communication apparatus, are associated with other communication apparatuses, respectively; and final statement content registering means responsive to a reception of a character message for rewriting a character message on the final statement content list stored in said final statement content storage unit, the character message being associated with another communication apparatus as an originator who issues the character message, into whole or part of the newly received character message, wherein said communication destination state display means displays, when said taking one's seat confirmation retrieval means detects the characters or the character train for confirming taking one's seat in the character message to be transmitted to the another communication apparatus, a state of the user of the another communication apparatus in the user state list stored in said user state storage unit, and in addition the character message on the final statement content list stored in said final statement content storage unit, the character message being associated with said another communication apparatus.

Displaying the final statement content of the other party of communication together with the state of the other party makes it possible to readily see the progress of the conversation with the other party.

To attain the above-mentioned object, a first communication program storage medium of the present invention stores therein a first communication program for causing the computer system to operate as a first communication apparatus. That is, according to the first communication program storage medium, there is provided a communication program storage medium incorporated into a computer system connected via a network to at least one another communication apparatus, adapted to store therein a communication program for causing said computer system to operate as a communication apparatus in which a character message transmitted from another communication apparatus is received and displayed, and a character message is inputted and transmitted to another communication apparatus, said communication program storage medium storing a communication program comprising:

received time obtaining means for obtaining received time of the character message transmitted from another communication apparatus;

final statement time registering means responsive to a reception of a character message for rewriting a time on a final statement time list in which received times of character messages, each being finally transmitted from an associated another communication apparatus, are associated with other communication apparatuses, respectively, the time being associated with another communication apparatus as an originator who issues the character message, into the received time of the character message obtained by said received time obtaining means; and final statement time display means for displaying the final statement time list.

To attain the above-mentioned object, a second communication program storage medium of the present invention stores therein a second communication program for causing the computer system to operate as a second communication apparatus. That is, according to the second communication program storage medium, there is provided a communication program storage medium incorporated into a computer system connected via a network to at least one another communication apparatus, adapted to store therein a communication program for causing said computer system to operate as a communication apparatus in which a character message transmitted from another communication apparatus is received and displayed, and a character message is inputted and transmitted to another communication apparatus, said communication program storage medium storing a communication program comprising:

final statement content registering means responsive to a reception of a character message for rewriting a character message on a final statement content list in which whole or part of character messages, each being finally transmitted from an associated another communication apparatus, are associated with other communication apparatuses, respectively, the character message being associated with another communication apparatus as an originator who issues the character message, into whole or part of the newly received character message; and final statement content display means for displaying the final statement content list.

To attain the above-mentioned object, a third communication program storage medium of the present invention stores therein a third communication program for causing the computer system to operate as a third communication apparatus. That is, according to the third communication program storage medium, there is provided a communication program storage medium incorporated into a computer system connected via a network to at least one another communication apparatus, adapted to store therein a communication program for causing said computer system to operate as a communication apparatus in which a character message transmitted from another communication apparatus is received and displayed, and a character message is inputted and transmitted to another communication apparatus, said communication program storage medium storing a communication program comprising:

user state retrieval means for retrieving characters or a character train representative of a state of a user as an operator of the communication apparatus from the received character message; and user state registering means responsive to a detection of characters or a character train representative of a state of the user by said user state retrieval means for rewriting a state of the user on a user state list in which states of a user as an operator of the communication apparatus are associated with other communication apparatuses, respectively, the state of the user being associated with another communication apparatus as an originator who issues the character message, into the state of the user represented by the characters or the character train detected by a retrieval of said user state retrieval means; and user state list display means for displaying the user state list.

In the third communication program storage medium, it is acceptable that said user state registering means serves, with respect to a predetermined first state of a plurality of types of states which may be registered on the user state list, to be responsive to receipt of a character message, but with omission of the retrieval of said user state retrieval means, and to rewrite a state of the user on the user state list, the state of the user being associated with another communication apparatus as an originator who issues the character message, into a predetermined second state different from the predetermined first state.

DESCRIPTION OF THE PREFERRED EMBODIMENTS

Hereinafter, there will be described embodiments of the present invention. First, the first to third communication apparatuses and the first to third communication programs according to embodiments of the present invention will be described, and then more specific embodiments, which are concerned with complex of the first to third communication apparatuses, will be described.

Figure 1:
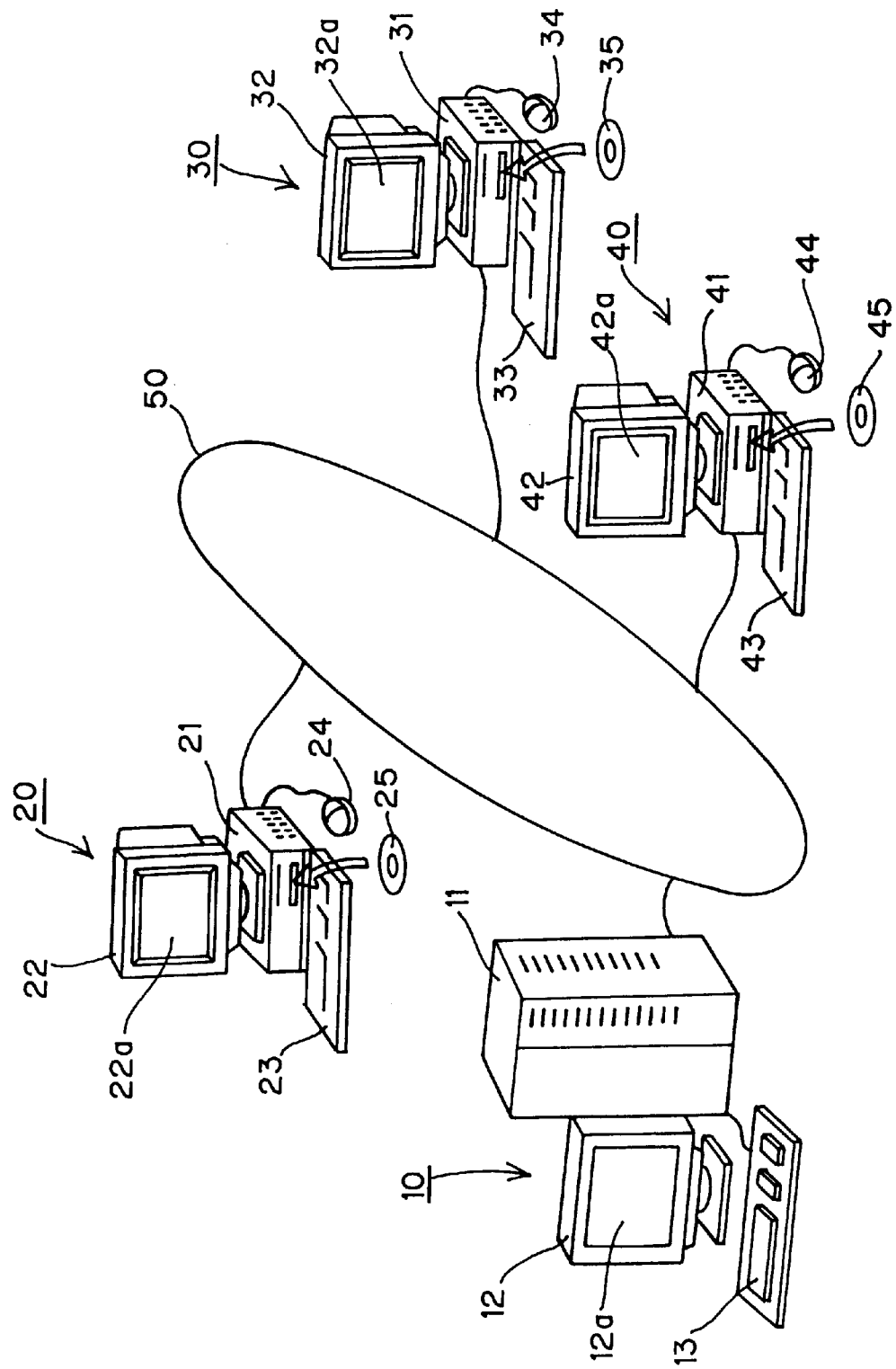
FIG. 1 is a conceptual view of a communication system.

FIG. 1 is a conceptual view of a communication system.

In FIG. 1, there is shown a communication system in which a single server 10 and three clients 20, 30 and 40, each of which consists of a computer system, are connected via a network 50 to one another.

A computer system, which constitutes the server 10, comprises a main frame 11 incorporating thereinto a CPU, a magnetic disc unit, etc., an image display unit 12 for displaying images on a display screen 12a, and a keyboard 13 serving as a handler for inputting various types of data. The server 10 serves to manage data necessary for the communication system, and also to mediate messages (conversation) between client-to-client. In this meaning, while the image display unit 12 and the keyboard 13 are unnecessary for the server 10, they are provided for the maintenance of the server 10.

On the other hand, computer systems, which constitute the clients 20, 30 and 40, respectively, comprises: main frames 21, 31 and 41 each incorporating thereinto a CPU, a magnetic disc unit, etc.; image display units 22, 32 and 42 for displaying images on display screens 22a, 32a and 42a, respectively; keyboards 23, 33 and 43 each serving as a handler for inputting various types of data to the associated computer system; and mouses 24, 34 and 44 each adapted for issuing various types of instructions to the associated computer system through designating an optional position on the associated one of display screens 22a, 32a and 42a, respectively.

The computer systems, which are used as the clients 20, 30 and 40, respectively, incorporate thereinto MO drive devices onto which magnet-optic disks (MO) 25, 35 and 45, which are portable type of storage medium, are detachably mounted, respectively, the MO drive devices being adapted for up loading programs and data stored in the MOs 25, 35 and 45 onto the main frames 21, 31 and 41, respectively, or for down loading programs and data stored in the main frames 21, 31 and 41 onto the MOs 25, 35 and 45, respectively.

A relationship between the communication system shown in FIG. 1 and the present invention is as follows.

The MOs 25, 35 and 45, which store therein the communication programs referred to in the present invention, are distributed from the host end of the communication system to the users who intend to join the communication system. The MOs 25, 35 and 45, which store therein such communication programs, correspond to an embodiment of the communication program storage medium of the present invention. The MOs 25, 35 and 45, which store therein the communication programs, are mounted on the computer systems, which constitute the clients 20, 30 and 40, respectively, so that the communication programs stored in the MOs 25, 35 and 45 are up loaded to be stored in the magnetic disks incorporated into the main frames 21, 31 and 41, respectively.

Therefore, the magnetic disks, which store the communication programs thus up loaded, also correspond to an embodiment of the communication program storage medium of the present invention.

In this manner, the communication programs are incorporated into the clients 20, 30 and 40, respectively, and each of the clients 20, 30 and 40 operates as a communication apparatus for interchanging messages (taking place conversations) via the server 10, on the basis of the combination use of the communication program and the hardware constituting the computer system used as the associated one of the clients 20, 30 and 40. Therefore, the clients 20, 30 and 40, into which the communication programs are incorporated, correspond to an embodiment of the communication apparatus of the present invention.

Figure 2:
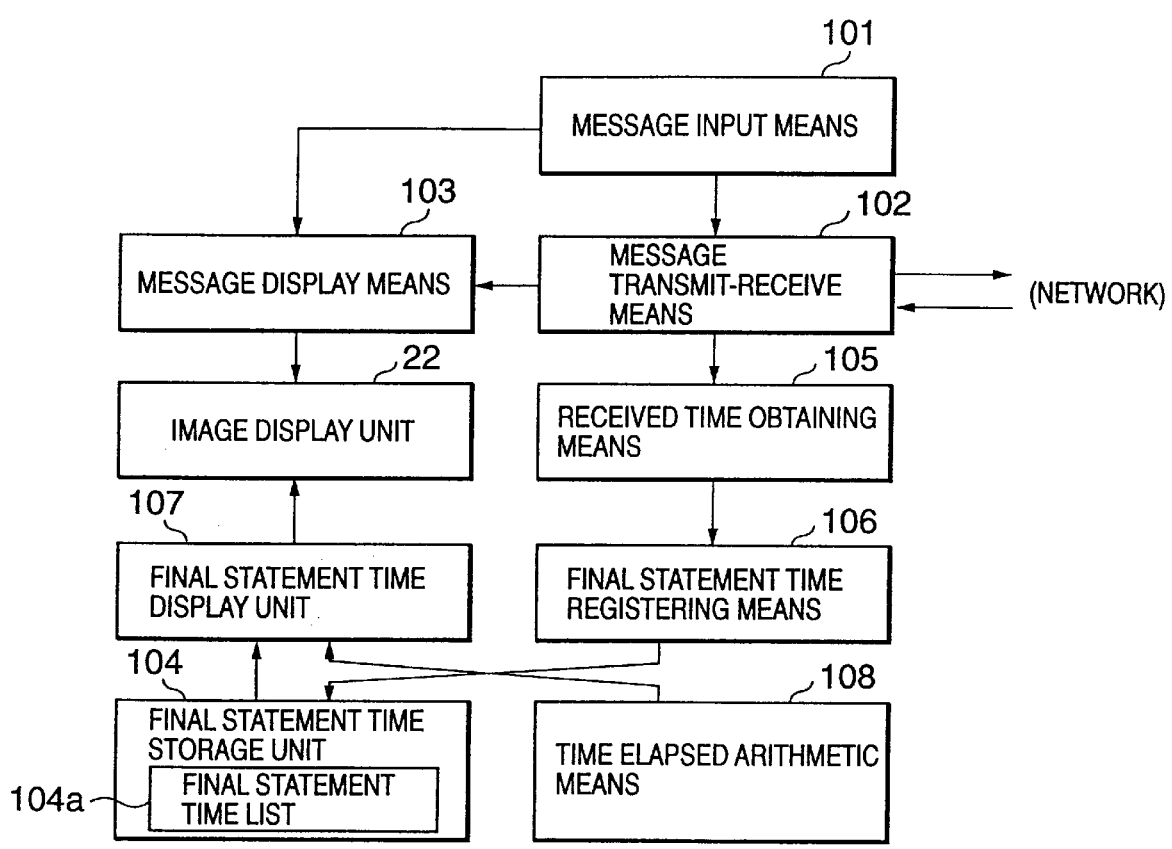
FIG. 2 is a block diagram showing a functional structure of a first communication apparatus according to an embodiment of the present invention, of communication apparatuses of the present invention constructed inside the client.

FIG. 2 is a block diagram showing a functional structure of a first communication apparatus according to an embodiment of the present invention, of communication apparatuses of the present invention constructed inside the client. It is assumed that functions of the communication apparatus shown in FIG. 2 are constructed in the client 20 shown in FIG. 1.

With respect to a message input means 101, on a hardware basis, the keyboard 23 and the mouse 34 of the client 20 shown in FIG. 1 correspond to the message input means 101. The message input means 101 is used to input character messages. The character messages thus inputted are displayed by a message display means 103 on the display screen 22a (cf. FIG. 1) of the image display unit 22. When the input of messages is terminated, the messages inputted through the message input means 101 are transmitted by a message transmit-receive means 102 via the server 10 (cf. FIG. 1) to another client. Messages issued by another client toward the client 20 are transmitted via the server 10 to the client 20 and are received by the message transmit-receive means 102. The messages thus received are converted by the message display means 103 into a format for display and are displayed on the display screen 22a (cf. FIG. 1) of the image display unit 22.

The communication apparatus shown in FIG. 2 has a final statement time storage unit 104 for storing a final statement time list 104*a* which establishes a correspondence between clients other than one's own self and times of the arrival of the final message from the associated client.

When the message transmit-receive means 102 receives a message which is issued from another client toward the client 20, a received time obtaining means 105 obtains the present time, that is, a time of receiving of the message by the message transmit-receive means 102, and a final statement time registering means 106 registers the time thus obtained onto a column of the client, who is an originator of the message, of the final statement time list 104*a* stored in the final statement time storage unit 104. On the occasion of registration, the previous received time already registered in the column of the client, who is an originator of the message, is replaced in rewritten by the time now obtained. In this manner, the final statement time list 104*a* always stores the final statement time (time concerned with final reception of messages) for each client.

The final statement time list 104*a* is read by a final statement time display means 107 at regular intervals or in accordance with an instruction of an operator (user) of the client 20, and is displayed on the display screen 22*a* of the image display unit 22.

A time elapsed arithmetic means 108 performs an arithmetic on the time elapsed up to now for each client referring to the final statement time for each client in the final statement time list 104*a* stored in the final statement time storage unit 104, and informs the final statement time display means 107 of the time elapsed for each client. When the final statement time list 104*a* read from the final statement time storage unit 104 is displayed on the display screen 22*a* of the image display unit 22, the final statement time display means 107 displays the columns of the respective clients with colors according to the time elapsed as to the associated client, for example, with red on less than one minute, with yellow on one minute to ten minutes, with blue on not less than 10 minutes to one hour, with gray on not less than one hour.

In the client (communication apparatus), the final statement time list is displayed on the display screen in the manner as mentioned above. Accordingly, the user of this client can determine whether a message is to be transmitted to a destination for a communication, referring to the final statement time list displayed on the display screen, and if it is decided to be transmitted, then the user can determine a content of the message to be transmitted.

Figure 3:
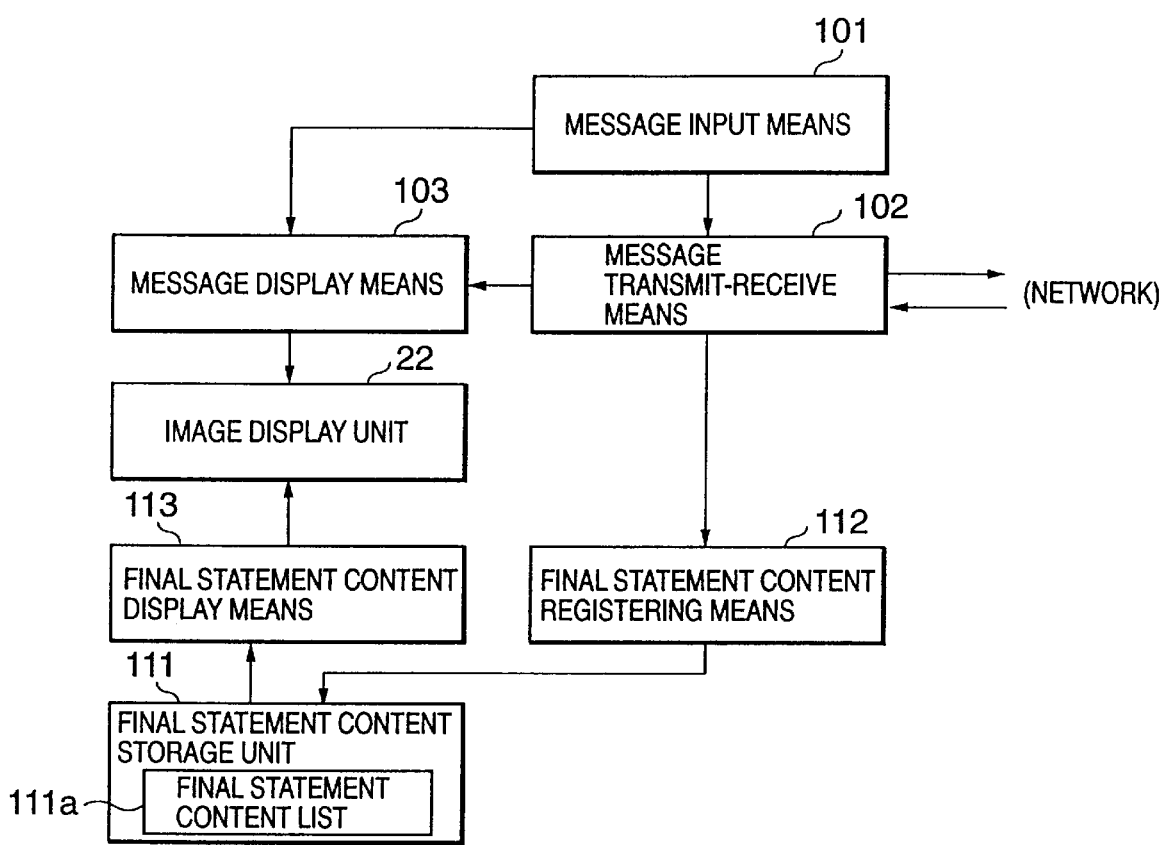
FIG. 3 is a block diagram showing a functional structure of a second communication apparatus according to an embodiment of the present invention, of communication apparatuses of the present invention constructed inside the client.

FIG. 3 is a block diagram showing a functional structure of a second communication apparatus according to an embodiment of the present invention, of communication apparatuses of the present invention constructed inside the client. Also in this case, it is assumed that functions of the communication apparatus shown in FIG. 3 are constructed in the client 20 shown in FIG. 1.

With respect to the message input means 101, the message transmit-receive means 102 and the message display means 103, they are the same as those of the communication apparatus shown in FIG. 2, and thus the redundant description will be omitted.

The communication apparatus shown in FIG. 3 has a final statement content storage unit 111 for storing a final statement content list 111*a* which establishes a correspondence between clients other than one's own self and the final message received from the associated client. In the event that the received message is too long in a sentence to be recorded in the final statement content list 111*a*, a part of the received message, for example, the top portion of the received message is recorded in the final statement content list 111*a*.

When the message transmit-receive means 102 receives a message which is issued from another client toward the client 20, a final statement content registering means 112 registers the received message onto a column of the client, who is an originator of the message, of the final statement content list 111*a* stored in the final statement content storage unit 111. On the occasion of registration, the previous received message already registered in the column of the client, who is an originator of the message, is replaced in rewritten by the message now received. In this manner, the final statement content list 111*a* always stores the final statement content (finally received message) for each client.

The final statement content list 111*a* is read by a final statement content display means 113 at regular intervals or in accordance with an instruction of an operator (user) of the client 20, and is displayed on the display screen 22*a* of the image display unit 22.

According to the communication apparatus shown in FIG. 3, the final statement content list is produced and displayed on the display screen in the manner as mentioned above. Thus, the user of this client can confirm the process of the conversation with the respective destination for a communication, referring to the displayed final statement content list, thereby determining the content of the message to be sent to the respective destination for a communication.

Figure 4:
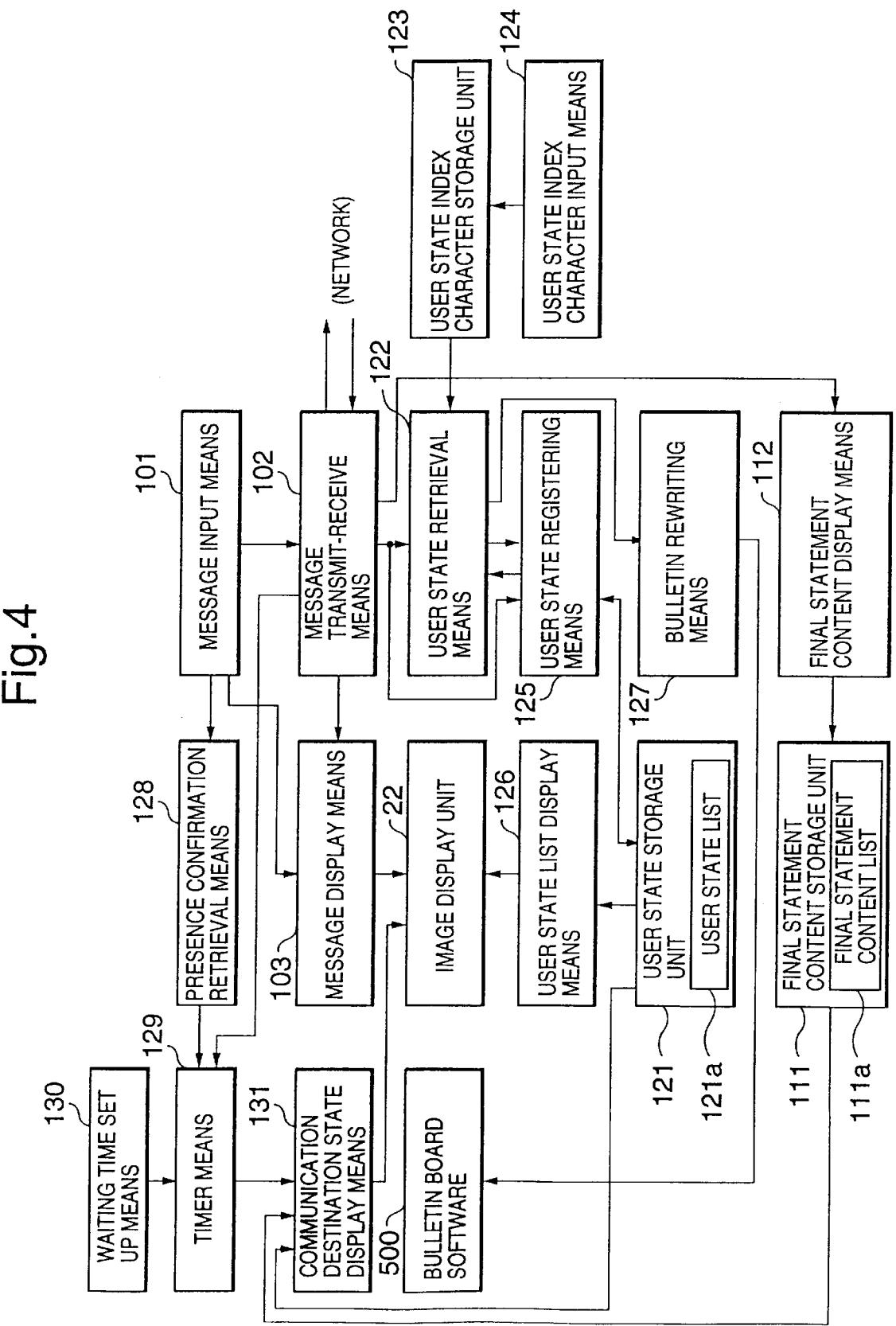
FIG. 4 is a block diagram showing a functional structure of a third communication apparatus according to an embodiment of the present invention, of communication apparatuses of the present invention constructed inside the client.

FIG. 4 is a block diagram showing a functional structure of a third communication apparatus according to an embodiment of the present invention, of communication apparatuses of the present invention constructed inside the client. Also in this case, it is assumed that functions of the communication apparatus shown in FIG. 4 are constructed in the client 20 shown in FIG. 1.

With respect to the message input means 101, the message transmit-receive means 102 and the message display means 103, they are the same as those of the communication apparatuses shown in FIGS. 2 and 3, and thus the redundant description will be omitted.

The communication apparatus shown in FIG. 4 has a user state storage unit 121 for storing a user state list 121*a* which establishes a correspondence between clients other than one's own self and the state of the user (referred to as the "user state") of the associated client. In the present embodiment, the user state means a "state of taking one's seat" representative of that the user is in the condition that the user can operate the associated client, a "state of leaving one's seat" representative of that the user leaves his seat for some time from a place of installation of the client, a "state of one's travelling" representative of that the user designates his destination and goes to the designated place for a certain measure of time, and a "state of one's going home" representative of that the user goes home, assuming that a place of installation of the client of the user is located at a place, for instance, his company, his office, etc., which is apart from his house.

When the message transmit-receive means 102 receives a message which is issued from another client toward the client 20, a user state retrieval means 122 retrieves characters or a character train representative of the user state from among the received message.

A user state index character storage unit 123 stores a correspondence between a user state and characters or a character train (speech) representative of the user state. The user state retrieval means 122 retrieves as to whether the received message includes speech associated with the user state, which stored in the user state index character storage unit 123. And when the user state retrieval means 122 detects the speech associated with the user state, it converts the speech into a user state meant by the speech.

A user state index character input means 124 comprises, for example, the keyboard 23 and the like of the client 20 shown in FIG. 1. An operation of the user state index character input means 124 makes it possible to increase or decrease and alter vocabularies of speech stored in the user state index character storage unit 123 in association with the user state.

When the user state retrieval means 122 detects through the retrieval the speech registered in the user state index character storage unit 123 in the received character message, and converts the detected speech into a user state, a user state registering means 125 registers in replacement, instead of the old user state, the user state represented by the detected speech in the column of the client as the originator of the message in the user state list stored in the user state storage unit 121.

A flow of registration of the user state as mentioned above is applied to a transfer from the "state of taking one's seat" to other states, such as the "state of leaving one's seat", the "state of one's travelling" and the "state of one's going home", and also a transfer from the "state of one's travelling" to the "state of taking one's seat", but not applied to a transfer from the "state of leaving one's seat" or the "state of one's going home" to the "state of taking one's seat".

When the message transmit-receive means 102 receives a character message which is issued from another client toward the client 20, first, the user state registering means 125 rewrites the user state into the "state of taking one's seat", referring to the column of the client as the originator of the character message in the user state list stored in the user state storage unit 121, when the user state of the column referred to indicates the "state of leaving one's seat" or the "state of one's going home". On the other hand, when the user state of the client indicates other than the "state of leaving one's seat" or the "state of one's going home", the user registering means 125 instructs the user state retrieval means 122 to start a retrieval. Upon receipt of the instruction, the user state retrieval means 122 to start a retrieval. In this manner, the user state list 121a always registers the latest user state for each client.

The user state list 121a is read by a user state list display means 126 at regular intervals or in accordance with an instruction of a user of the client 20, and is displayed on the display screen 22a of the image display unit 22 (cf. FIG. 1).

According to the communication apparatus shown in FIG. 4, the user state list is produced and displayed on the display screen in the manner as mentioned above. Thus, the user of this client can determine whether messages are to be transmitted to parties, referring to the displayed user state list.

The communication apparatus shown in FIG. 4 incorporates thereinto a bulletin software 500 is a program in which whereabouts of the party is registered and the registered whereabouts is displayed on the display screen 22a of the image display unit 22. While this bulletin program is not a communication program of the present invention per se, it is preferable, when such a bulletin program is incorporated into the communication apparatus, that the communication apparatus is operative in cooperation with the bulletin program. Thus, the communication apparatus shown in FIG. 4 has a bulletin rewriting means 127 as a part of the communication program. The bulletin rewriting means 127 serves, when the user state retrieval means 122 detects the "state of one's travelling", to register words indicating the place where one is going, or whereabouts, with the bulletin software in association with the client as the originator of the message. This makes it possible to save one trouble for registration of whereabouts through direct access to the bulletin software.

The communication apparatus shown in FIG. 4 has a presence confirmation retrieval means 128 for retrieving whether a message inputted from the message input means 101, which is intended to be transmitted to another client, includes words for confirmation as to whether the user of the client of the party is in the state of taking one's seat. Specifically, for example, the user's name "xxx" of the party is indicated, and such a question word that 'is "xxx" in ?' is detected. When this word is detected, it is informed a timer means 129 that the word has been detected, and the user's name is informed the timer means 129. On the other hand, the message transmit-receive means 102 informs the timer means 129 that the message has been originated. The timer means 129 counts a predetermined waiting time from a time at which the message has been originated. This waiting time can be optionally set up by the user through a waiting time set up means 130, that is, the keyboards 23 or the mouse 24 shown in FIG. 1 on a hardware basis.

When the timer means 129 counts up the predetermined waiting time, the timer means 129 transfers the user's name "xxx" to a communication destination state display means 131. The communication destination state display means 131 refers to the user state of the column of the user's name "xxx" in the user state list 121a stored in the user state storage unit 121 to display on the display screen 22a of the image display unit 22 (cf. FIG. 1) the user state of the user's name "xxx" which is registered in the user state list 121a. This makes it possible for the user of the client 20 to know the state of the party for a communication without waiting for long time a response of the client of the user's name "xxx"8.

The communication apparatus shown in FIG. 4 has further a final statement content registering means 112 and a final statement content storage unit 111 for storing a final statement content list 111a. The final statement content registering means 112 and the final statement content storage unit 111 are the equivalent to those explained referring to FIG. 3, and thus the redundant explanation will be omitted.

When the communication destination state display means 131 displays on the image display unit 22 the user state of the party for a communication, which is registered in the user state list 121a, the communication destination state display means 131 reads the final speech content of the column of the communication destination in the final statement content list 111a and displays on the display screen 22a of the image display unit 22 the final speech content of the user together with the user state of the party for a communication. This feature makes it possible to grasp the user state of the party for a communication with greater accuracy.

Figure 5:
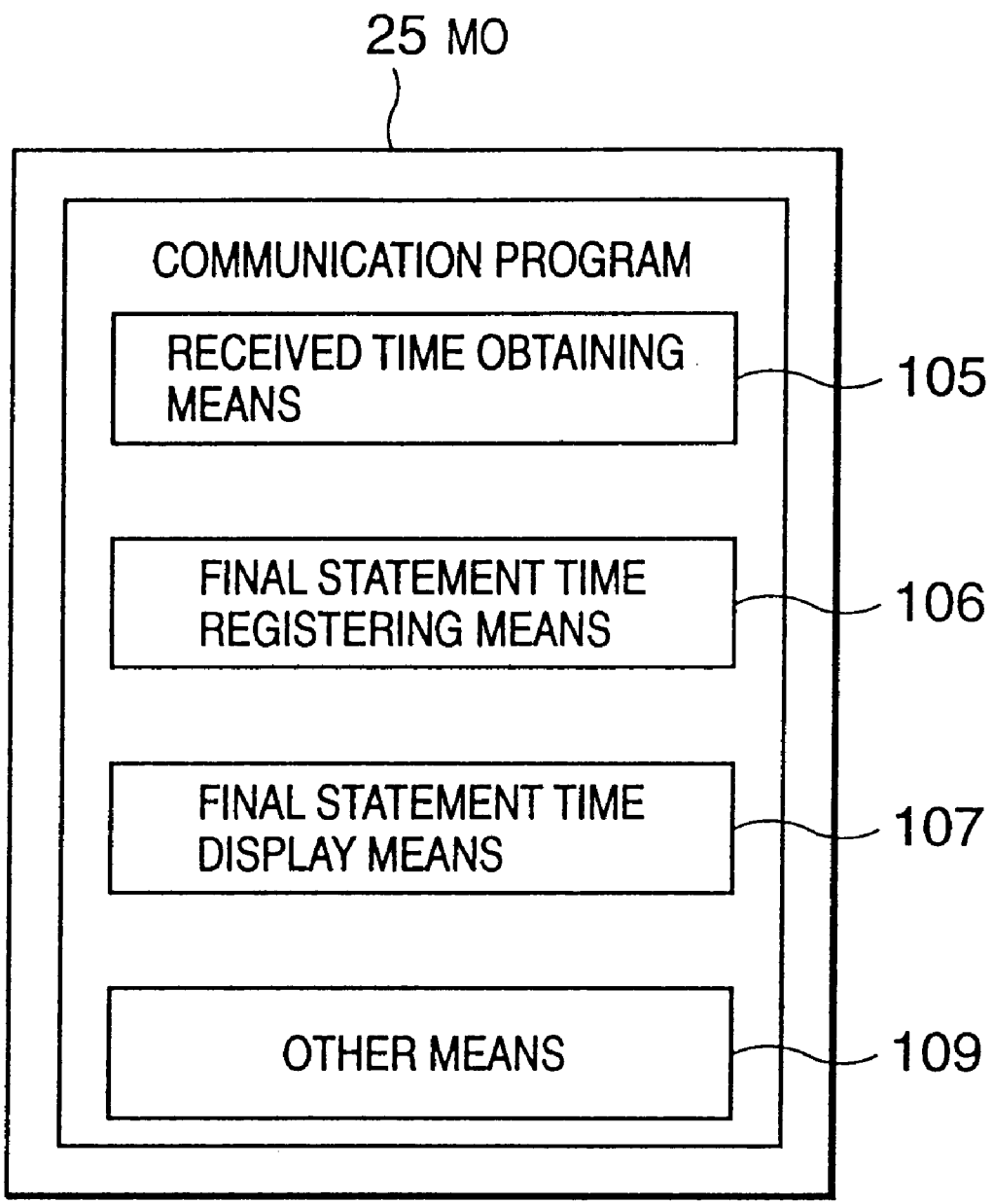
FIG. 5 is a typical illustration showing a structure of a first communication program, of communication programs of the present invention, which is stored in a MO (magnet-optic disk)

FIG. 5 is a typical illustration showing a structure of a first communication program, of communication programs of the present invention, which is stored in a MO (magnet-optic disk). Here, the explanation will be made assuming that the communication program is stored in the MO 25 mounted on the client 20, of the MO 25, MO 35 and MO 45 shown in FIG. 1. This is the similar as to the matter of the communication programs shown in FIGS. 6 and 7.

The communication program shown in FIG. 5 is incorporated into the client 20 to operate as the communication apparatus explained referring to FIG. 2, and has the received time obtaining means 105, the final statement time registering means 106, the final statement time display means 107 and other means 109 necessary for implementing the communication apparatus shown in FIG. 2. Those means have been explained in their operation referring to FIG. 2, and thus the redundant description will be omitted.

The MO 25, which stores therein the communication program shown in FIG. 5, is distributed from the host end of the communication system to the user of the client 20. The user of the client 20 mounts the MO 25 on the client 20 to up load the communication program onto the client 20, and thereby incorporating the communication program into the client 20. Thus, the client 20 can operate as the communication apparatus explained referring to FIG. 2.

Figure 6:
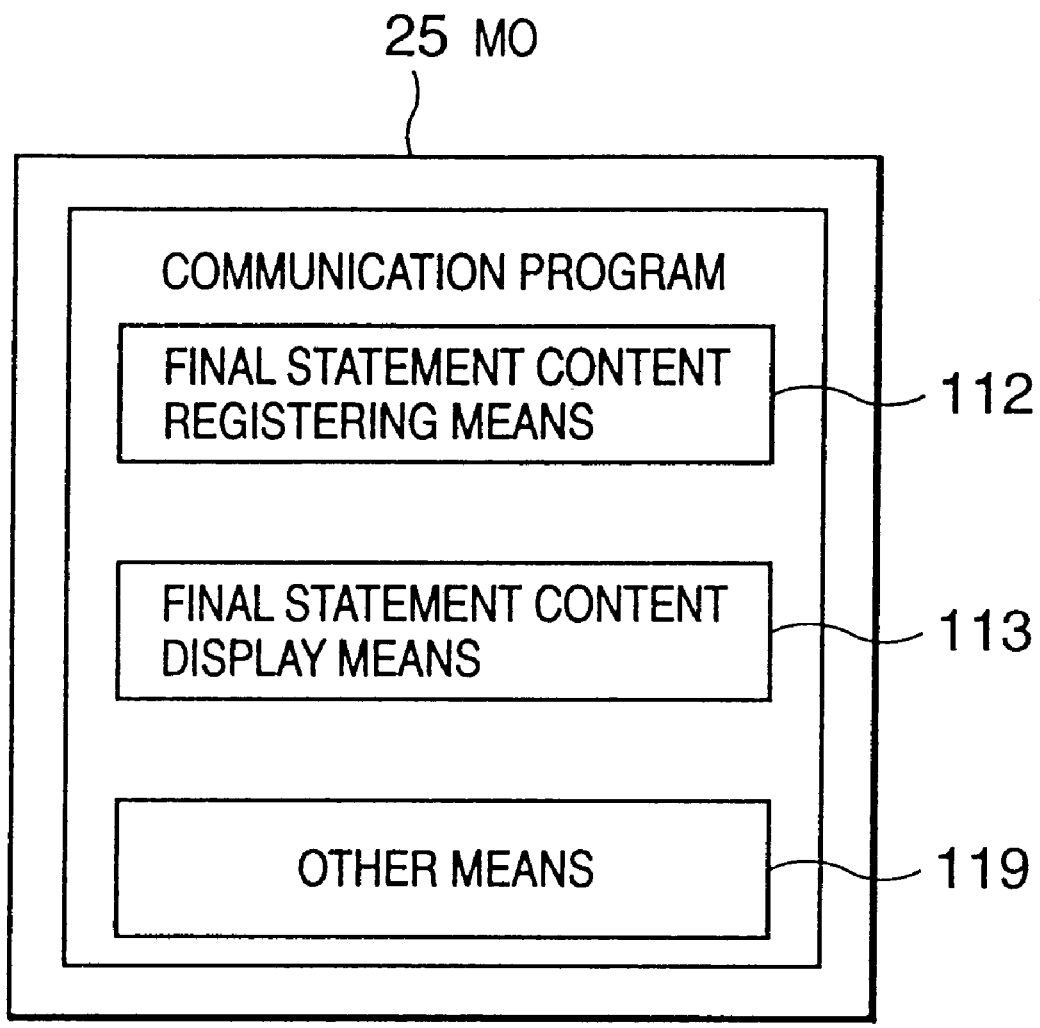
FIG. 6 is a typical illustration showing a structure of a second communication program, of communication programs of the present invention, which is stored in a MO (magnet-optic disk)

FIG. 6 is a typical illustration showing a structure of a second communication program, of communication programs of the present invention, which is stored in a MO.

The communication program shown in FIG. 6 is incorporated into the client 20 to operate as the communication apparatus explained referring to FIG. 3, and has the final statement content registering means 112, the final statement content display means 113 and other means 119 necessary for implementing the communication apparatus shown in FIG. 3. Those means have been explained in their operation referring to FIG. 3, and thus the redundant description will be omitted.

The MO 25, which stores therein the communication program shown in FIG. 6, is distributed from the host end of the communication system to the user of the client 20. The user of the client 20 mounts the MO 25 on the client 20 to up load the communication program onto the client 20, and thereby incorporating the communication program into the client 20. Thus, the client 20 can operate as the communication apparatus explained referring to FIG. 3.

Figure 7:
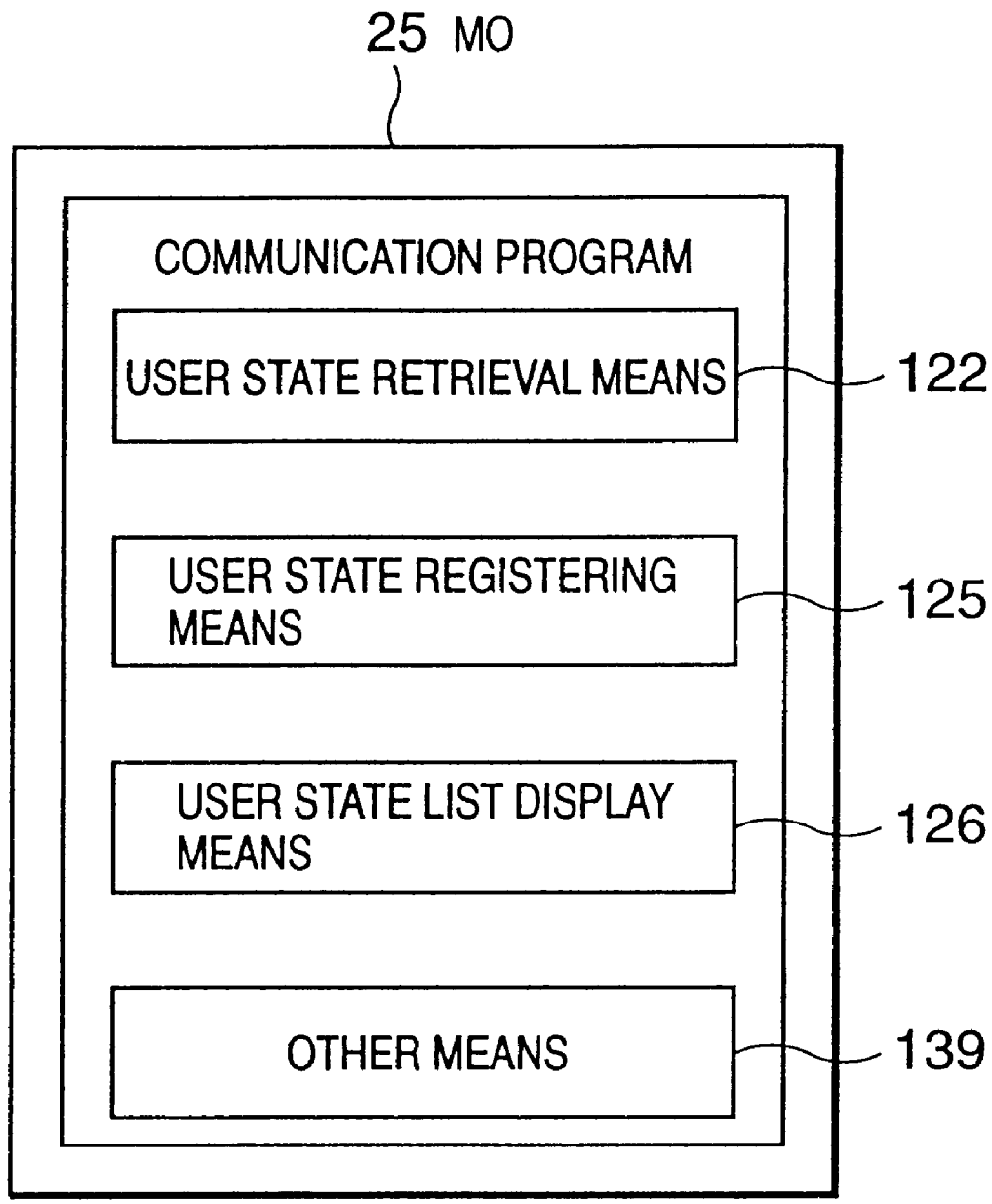
FIG. 7 is a typical illustration showing a structure of a third communication program, of communication programs of the present invention, which is stored in a MO (magnet-optic disk)

FIG. 7 is a typical illustration showing a structure of a third communication program, of communication programs of the present invention, which is stored in a MO.

The communication program shown in FIG. 7 is incorporated into the client 20 to operate as the communication apparatus explained referring to FIG. 4, and has the user state retrieval means 122, the user state registering means 125, the user state list display means 126 and other means 139 necessary for implementing the communication apparatus shown in FIG. 4. Those means have been explained in their operation referring to FIG. 4, and thus the redundant description will be omitted.

The MO 25, which stores therein the communication program shown in FIG. 7, is distributed from the host end of the communication system to the user of the client 20. The user of the client 20 mounts the MO 25 on the client 20 to up load the communication program onto the client 20, and thereby incorporating the communication program into the client 20. Thus, the client 20 can operate as the communication apparatus explained referring to FIG. 4.

Next, there will be explained more specific embodiments which are concerned with complex of the first to third communication apparatuses.

Figure 8:
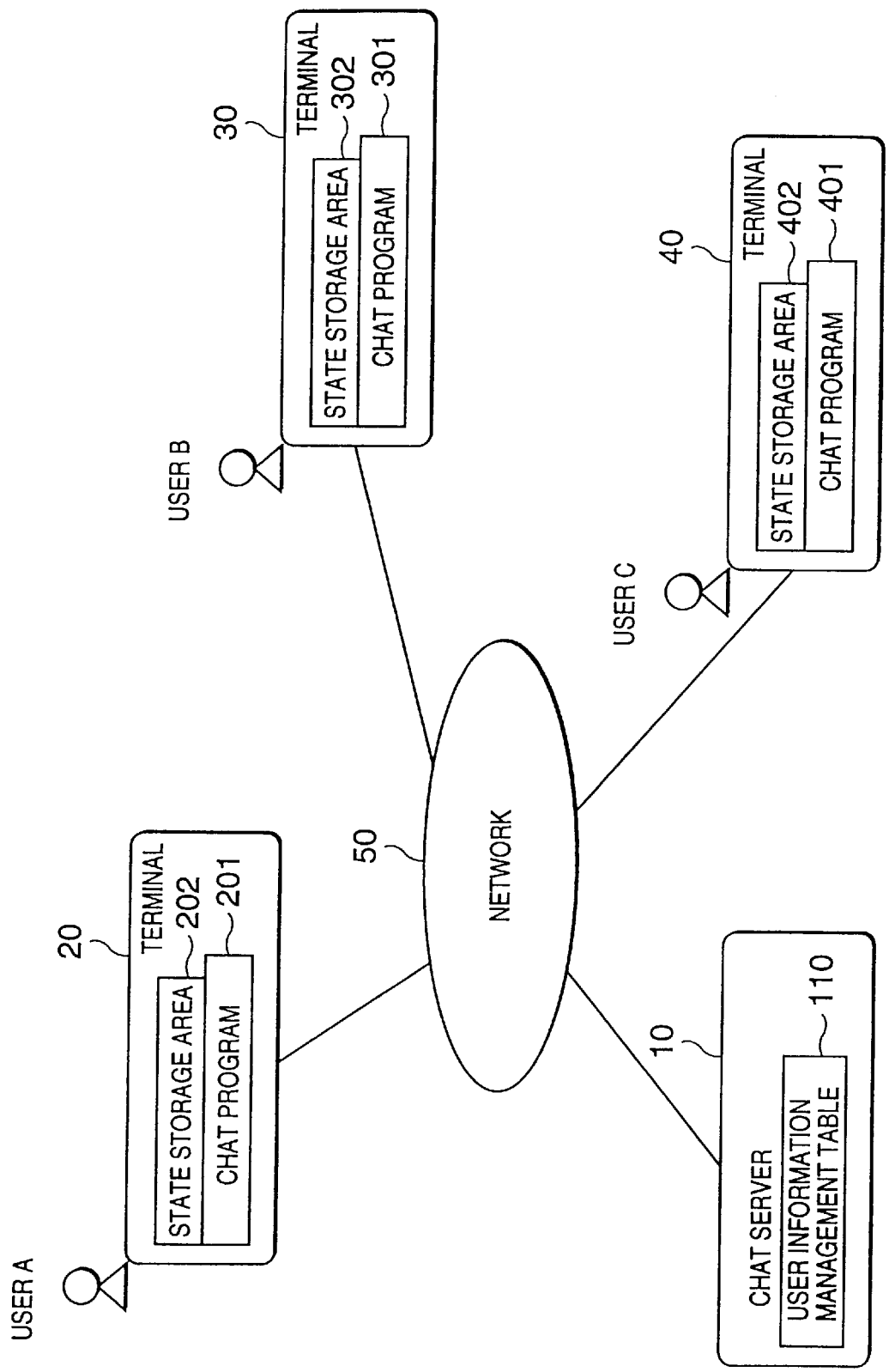
FIG. 8 is a schematic diagram showing a functional structure of a chat system according to an embodiment of the present invention.

FIG. 8 is a schematic diagram showing a functional structure of a chat system according to an embodiment of the present invention.

Users A, B and C have terminals 20, 30 and 40, respectively. The terminals 20, 30 and 40 incorporate thereinto chat programs 201, 301 and 401, respectively, which are examples of the communication programs referred to in the present invention. The chat programs 201, 301 and 401 are provided with state storage areas 202, 302 and 402, respectively. The terminals 20, 30 and 40 are connected to a network 50 to which a chat server 10 is also connected. The chat server 10 has a user information management table 110 for managing data of nicknames of users A, B and C, and real names of users A, B and C, etc. It is noted that the chat server 10, and the terminals 20, 30 and 40 correspond to the computer systems 10, 20, 30 and 40 shown in FIG. 1, respectively.

The users A, B and C may use the chat programs 201, 301 and 401, which are incorporated into the terminals 20, 30 and 40, respectively, to access via the network 50 to the chat server 10. The chat programs 201, 301 and 401 transmit to the chat server 10 information as to nicknames of users A, B and C, and real names of users A, B and C, etc. The chat server 10 registers such information with a user information management table 110. An example of the user information management table 110 is shown in Table 1.

TABLE 1

| TERMINAL NAMES | USER'S NICKNAMES | USER'S REAL NAMES |
|---|---|---|
| Terminal 20 | MUL | Masahiko Murakami |
| Terminal 30 | Youchan | Yohichi Watanabe |
| Terminal 40 | Micky | Mikio Arai |
| ... | ... | ... |

The user information management table 110 shown in Table 1 shows names of terminals of users A, B and C, nicknames of users A, B and C, and real names of users A, B and C.

Statement contents on the chat programs 201, 301 and 401 by the users A, B and C are transmitted via the network 50 to the chat server 10. Upon receipt of the statement content, the chat server 10 distributes the statement content and the nickname of the associated user to terminals of users, except the terminal of the user who issued the statement, of the terminals connected via the network 50 to the chat server 10.

In the event that a new user is connected to the chat server 10, and in the event that a certain user, who is now connected to the chat server 10, is disconnected from the chat server 10, those situations are informed to the respective users. Thus, the respective users can readily identify the terminals which are now connected.

Further, every when a user takes part in a chat, the chat program of the terminal of the user produces a user state table as shown in Table 2, in a state storage area of the terminal of the user.

TABLE 2

| NICKNAMES | REAL NAMES | FINAL STATEMENT TIME | FINAL STATEMENT CONTENTS | STATES | PLACES |
|---|---|---|---|---|---|
| Micky | Mikio Arai | 1997/318 18:55:05 | Good-bye | Going home | Hospital |
| ... | ... | ... | ... | ... | ... |

The user state table shown in Table 2 consists of user's records as to a plurality of users. Each of the user's records consists of a nickname registration column for registering the associated user's nickname, a real name registration column for registering the associated user's real name, a final statement time registration column for registering the final statement time of the associated user, a final statement content registration column for registering the final statement content of the associated user, a state registration column for registering the state of the associated user, for example, the state of going home of the associated user, and a place registration column for registering whereabouts of the associated user.

The chat program has a correspondence table between states and words/phrases (statements) as shown in Table 3 set forth below.

TABLE 3

| ASSOCIATED STATES | WORDS/PHRASES |
|---|---|
| Leaving one's seat | I will leave my seat |
| Leaving one's seat | I will get up from my seat |
| Place | Hospital |
| Place | Library |
| Place | Conference |
| Movement | I will go to |
| Movement | Translation |
| Taking one's seat | I return |
| Taking one's seat | Office |
| Going home | Go back |
| Going home | I will go home |
| . . . | . . . |
| . . . | . . . |

For example, in the event that a user's statement includes such a phrase that "I will leave my seat", it is decided in accordance with Table 3 that the state of the user translates to the state of "Leaving one's seat". Also in the event that a user's statement includes such a phrase that "I will get up from my seat", it is associated with the state of of "Leaving one's seat".

In the event that a user's statement includes a word "Hospital", it is associated with the state of "Place". Also in the event that a user's statement includes words "Library" and "Conference", they are associated with the state of "Place". Incidentally, while the "Place" itself is not a word indicative of the state of the user, the "Place" supplements the state of "Movement", which will be described hereinafter, and indicates the destination in the state of "Movement". Thus, for the sake of convenience, the "Place" itself is dealt with as a certain state.

In the event that a user issues a phrase such that "I will go to", which is indicative of the movement, the user is associated with the state of "Movement". Also in the event that a user issues a word "Translation", the user is associated with the state of "Movement".

In the event that a user issues a phrase such that "I return", or a word "Office", which are indicative of the return, the user is associated with the state of "Taking one's seat".

In the event that a user issues a word "Go back", or a phrase such that "I will go home", the user is associated with the state of "Going home".

There is prepared a dialog for editing according to the chat program so that a user can edit the correspondence table between states and words/phrases, whereby the user can perform an editing work in which various user's states are associated with various words and phrases.

Figure 9:
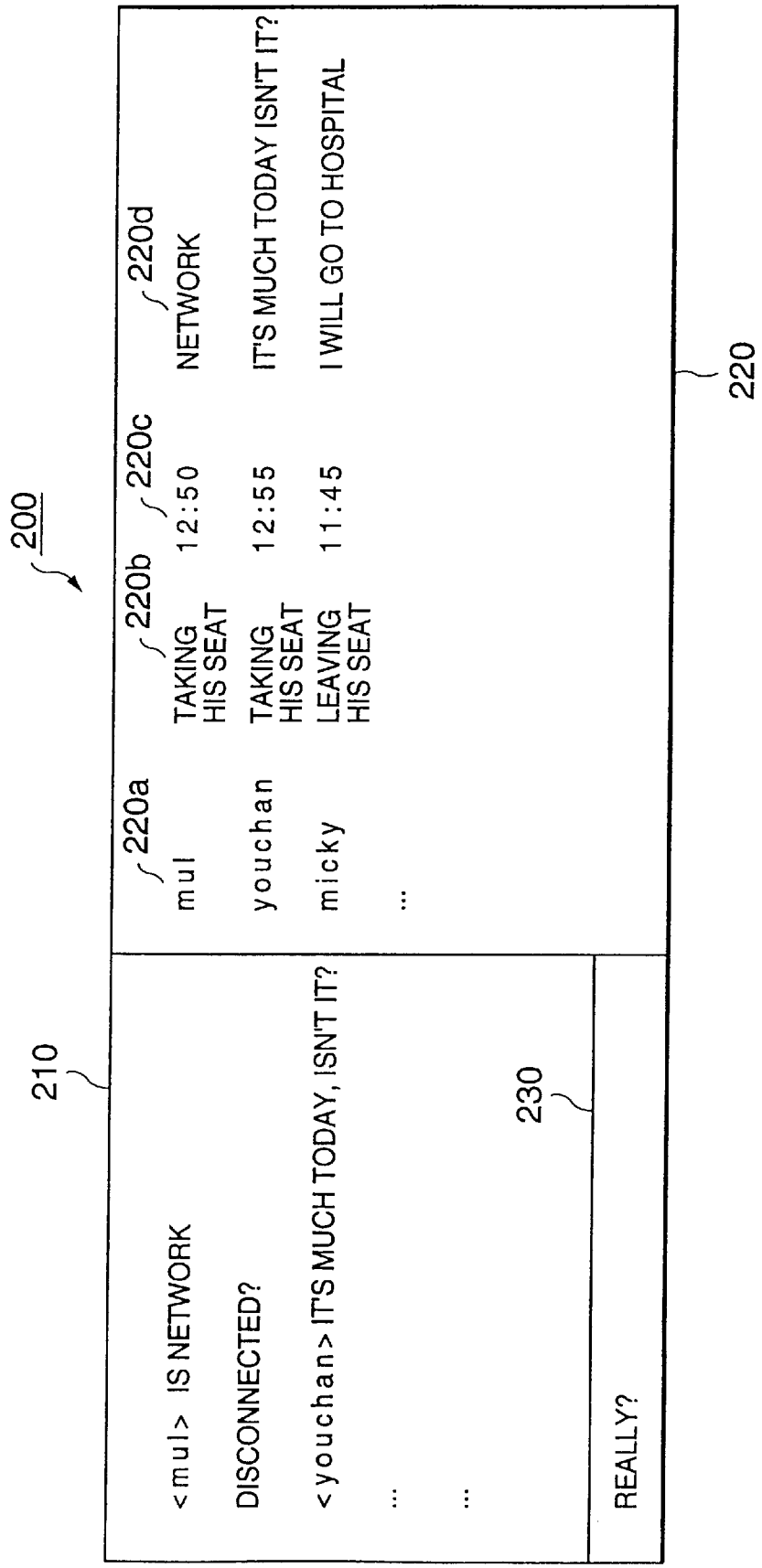
FIG. 9 is a view showing a screen of a user terminal, which is displayed in accordance with a chat program.

FIG. 9 is a view showing a screen of a user terminal, which is displayed in accordance with a chat program.

A screen 200 of the user terminal shown in FIG. 9 is divided into three divisions of a chat log window 210, a user list window 220 and a statement window 230.

The chat log window 210 is for displaying statement contents of the users.

The user list window 220 is for displaying for each user a nickname 220a of the associated user, a user's state 220b of the associated user, a final statement time 220c of the associated user and a final statement content 220d of the associated user.

The statement window 230 is for displaying statements of the user concerned with this terminal, which are inputted through a keyboard.

Figure 10:
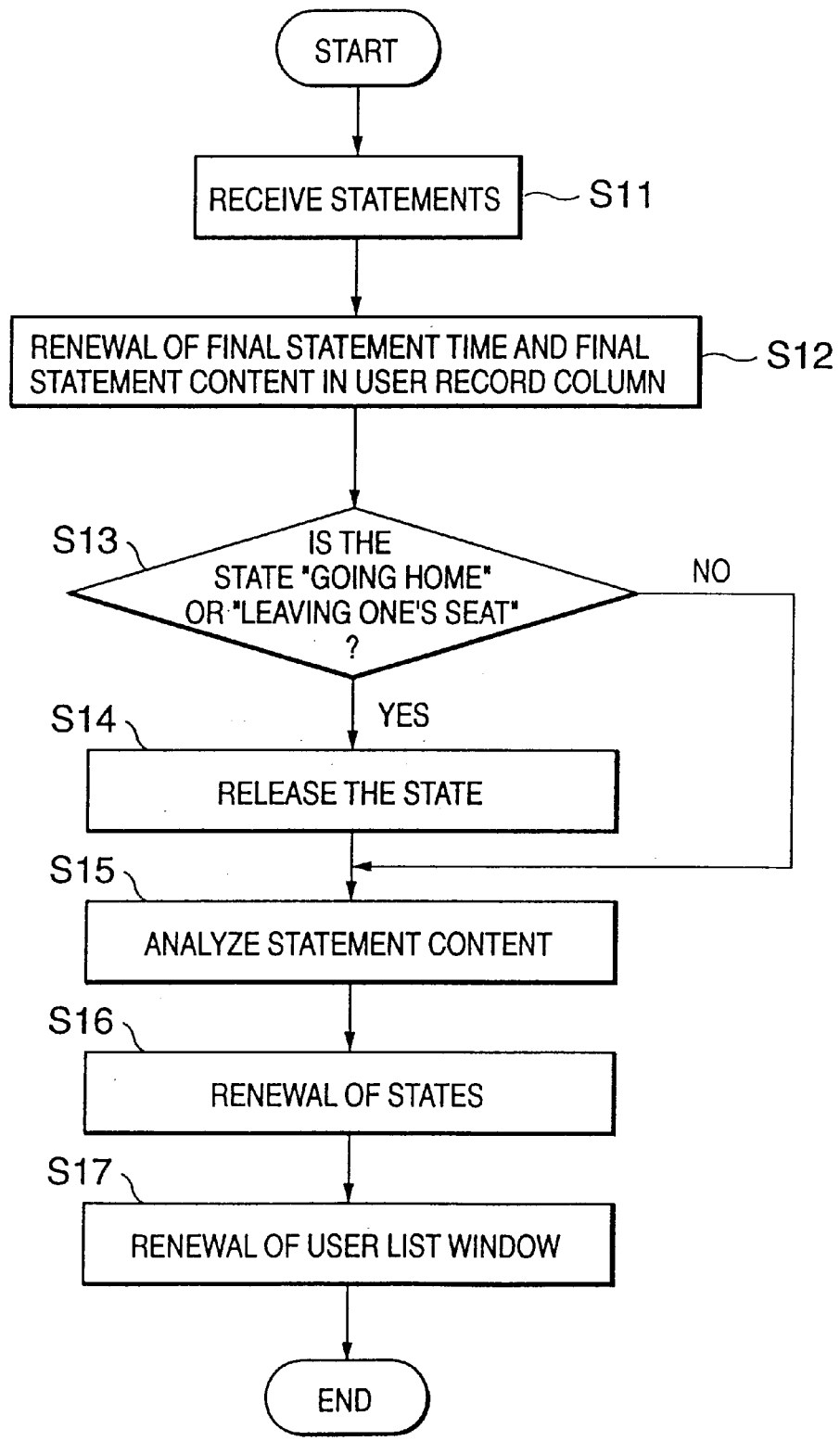
FIG. 10 is a flowchart useful for understanding an operation of a chat program.

FIG. 10 is a flowchart useful for understanding an operation of a chat program.

First, in a step S11, the user terminal receives statement contents of other users except oneself. In a step S12, the final statement time and the final statement content in the record column for the associated user (originator) of the user state list are renewed to a time of the statement content now received and the new statement content, respectively.

Next, in a step S13, it is decided in accordance with the received statement content of another user whether the state of the associated user is in the state of "Going home" or the state of "Leaving one's seat", or alternatively in other than the state of "Going home" and the state of "Leaving one's seat". When it is decided that the state of the associated user is in the state of "Going home" or the state of "Leaving one's seat", the process goes to a step S14 in which the state of "Going home" or the state of "Leaving one's seat" indicated in the state column of the user state table is released to set up the state of "Taking one's seat". On the other hand, in the step S13, when it is decided that the state is in other than the state of "Going home" and the state of "Leaving one's seat", the process goes to a step S15.

In the step S15, the statement content is compared with the correspondence table between states and words/phrases to analyze the statement content. For example, in the event that the statement content of the user includes words indicative of the state of leaving his seat, such as "I will leave my seat", the state of the user is associated with the state of "Leaving one's seat" in accordance with the correspondence table between states and words/phrases. In the event that the statement content of the user includes words indicative of the place, such as "Hospital", the state of the user is associated with the state of "Place" in accordance with the correspondence table between states and words/phrases. In the event that the statement content of the user includes words indicative of the movement, such as "I will go to", the state of the user is associated with the state of "Movement" in accordance with the correspondence table between states and words/phrases. In the event that the statement content of the user includes words indicative of going home, such as "Go back", the state of the user is associated with the state of "Going home" in accordance with the correspondence table between states and words/phrases. In the event that the statement content of the user includes words indicative of the return, such as "I return", the state of the user is associated with the state of "Taking one's seat" in accordance with the correspondence table between states and words/phrases.

In a step S16, the state column of the user state table is renewed. For example, in the event that it is associated with the state of "Leaving one's seat", the state column of the user state table is set up to the state of "Leaving one's seat". In the event that it is associated with the state of "Movement", the state column of the user state table is set up to the state of "Movement". In the event that it is associated with the state of "Going home", the state column of the user state table is set up to the state of "Going home".

Next, the process goes to a step S17 in which the user list window 220 shown in FIG. 9 is renewed in accordance with the user state table.

Figure 11:
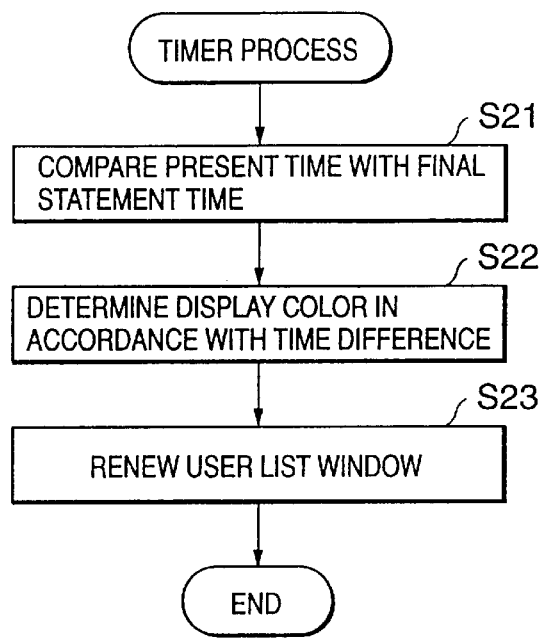
FIG. 11 is a flowchart of a timer processing routine for displaying columns of users constituting a user list window with color identification according to a time difference.

FIG. 11 is a flowchart of a timer processing routine for displaying columns (for example, nicknames 220a, states 220b, final statement times 220c, and final statement contents 220d shown in FIG. 9) of users constituting a user list window with color identification according to a time difference.

This timer processing routine is activated for each predetermined time. First, in a step S21 the present time is compared with the final statement time registered with the final statement time registration column in the user state table to compute a time difference between the present time and the final statement time. Next, the process goes to a step S22 in which a display color is determined in accordance with the time difference. In the present embodiment, if the time difference between the present time and the final statement time is within one minute, the display color for the column of the user in the user list window is determined to red. If the time difference is within ten minutes, within one hour and over one hour, the display color for the column of the user in the user list window is determined to yellow, blue and gray, respectively. Next, in a step S23 the columns of the user constituting the user list window are displayed with colors determined in the step S22, and the routine is terminated.

In this manner, displaying the user columns in the user list window with the display color according to the time difference between the present time and the final statement time makes it possible to intuitively know the time elapsed since the final statement time of the user.

According to the present embodiment, in the event that the user terminal incorporates thereinto a bulletin board software for displaying whereabouts, the state information of the user is informed to the bulletin board software.

Figure 12:
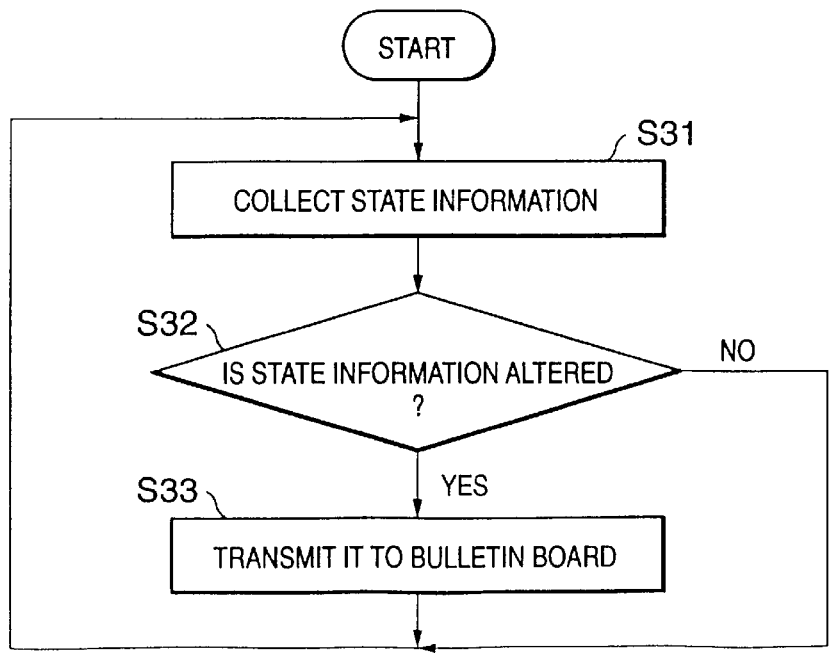
FIG. 12 is a flowchart of a routine for informing a bulletin board software of the user state.

FIG. 12 is a flowchart of a routine for informing a bulletin board software of the user state.

First, in a step S31 state information of the user is collected. Next, in a step S32 it is decided whether the collected state information is altered. When it is decided that the state information is altered, the process goes to a step S33 in which the state information is transmitted to the bulletin board software, and then the process returns to the step S31. On the other hand, When it is decided that the state information is not altered, the process returns to the step S31.

According to the chat program of the present embodiment, in the event that a user uses a nickname 'xxx' of a participant (the other party of user) in the chat and confirms the presence of the other party of user in such a manner that "Is 'xxx' in ?", if the other party of user gives no response for a predetermined time, the associated user displays state information of the other party of user on the associated user terminal. The user can set up the predetermined time (time-out time) optionally. The set up time-out time is stored in the associated user terminal. When the user confirms the presence of the other party of user in such a manner that "Is 'xxx' in ?", the time-out time is stored in the time-out management table set forth below together with the nickname 'xxx' of the other party of user, and is subjected to the subtraction at regular intervals. When a result of the subtraction becomes zero, or when the time-out time passes, state information of the other party of user is displayed on one's own associated user terminal. Table 4 shown an example of the time-out management table.

TABLE 4

| Nicknames of other parties of user | Remaining time (seconds) |
|---|---|
| MUL | 5 |
| youchan | 4 |
| — | — |

The time-out management table shown in Table 4 shows nicknames of other parties of user and the remaining time (seconds) before the time-out time.

Figure 13:
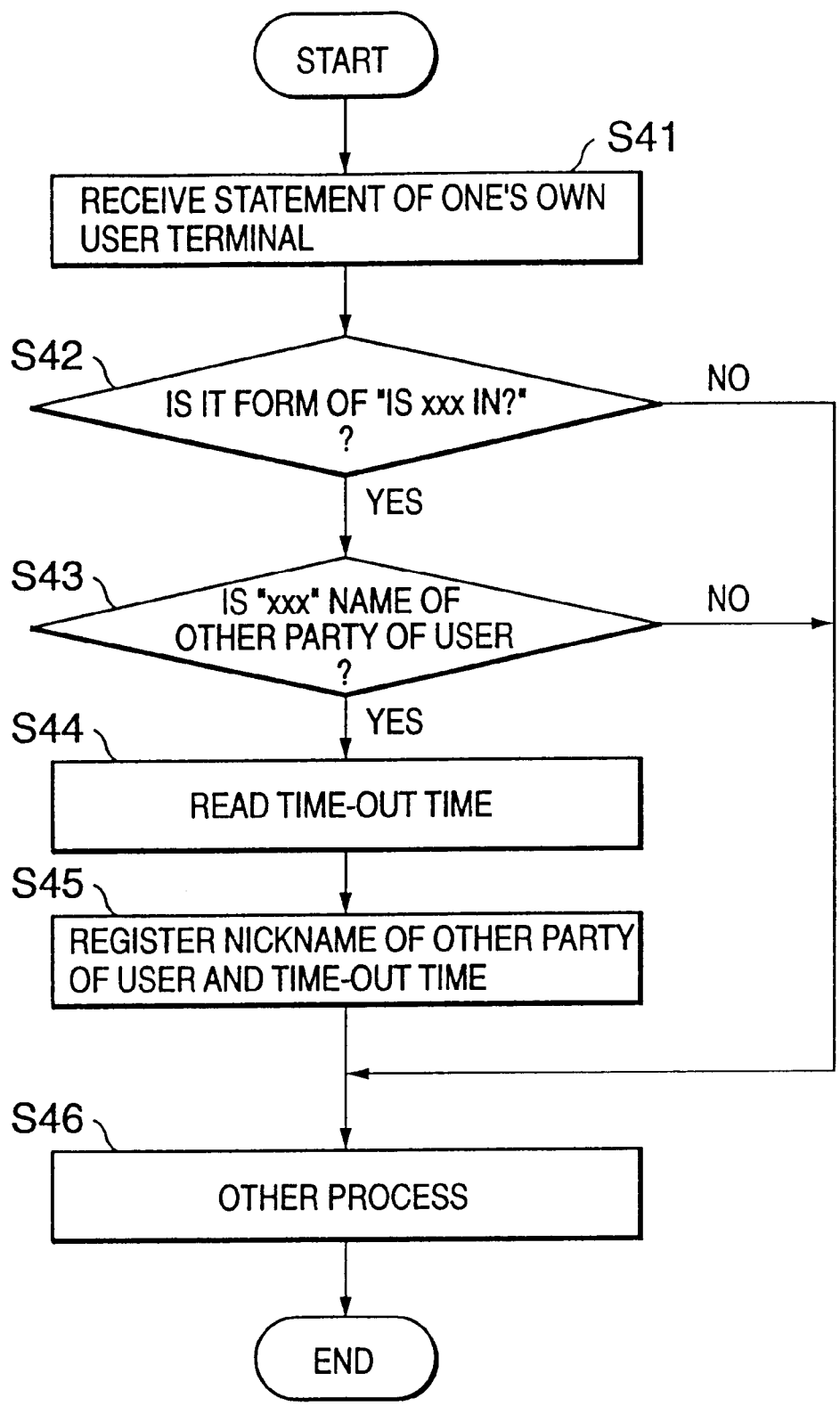
FIG. 13 is a flowchart of a routine for registering nicknames of destination users and time-out times with a time-out management table.

FIG. 13 is a flowchart of a routine for registering nicknames of destination users and time-out times with a time-out management table.

In a step S41, upon receipt of a statement of one's own user terminal, the process goes to a step S42 in which it is determined whether the received statement is concerned with the form of "is 'xxx' in ?". In the event that it is decided that the received statement is not concerned with the form of "is 'xxx' in ?", the process goes to a step S46 in which the process goes to another process. On the other hand, in the event that it is decided that the received statement is concerned with the form of "is 'xxx' in ?", the process goes to a step S43 in which it is determined whether 'xxx' is concerned with the name of the other party of user. When it is decided that 'xxx' is not concerned with the name of the other party of user, the process goes to the step S46 in which the process goes to another process. On the other hand, when it is decided that 'xxx' is concerned with the name of the other party of user, the process goes to a step S44 in which a time-out time, which is set up by the user beforehand, is read. Next, the process goes to a step S45 in which the nickname of the other party of user and the time-out time are registered with the time-out management table, and then goes to the step S46 in which another necessary processing is performed, and this routine is terminated.

Figure 14:
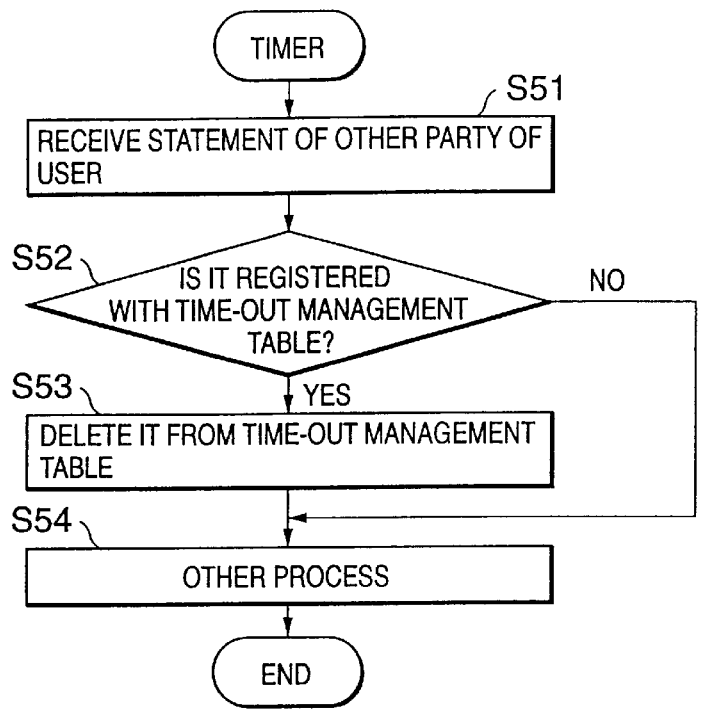
FIG. 14 is a flowchart of a routine for deleting destination users registered with a time-out management table.

FIG. 14 is a flowchart of a routine for deleting destination users registered with a time-out management table. In accordance with the routine shown in FIG. 14, in the event that the other party of user issues his statement before it reaches the time-out time, information related to the other party of user is deleted from the time-out management table. As a result, the state information of the other party of user is not displayed on the screen of the image display.

In a step S51, upon receipt of a statement of the other party of user, the process goes to a step S52 in which it is determined whether the nickname of the other party of user is registered with the time-out management table. In the event that it is decided that the nickname of the other party of user is registered with the time-out management table, the process goes to a step S53 in which the column of the other party of user is deleted from the time-out management table, and the process goes to a step S54. In the event that it is decided that the nickname of the other party of user is not registered with the time-out management table, the process goes directly to the step S54 in which another necessary processing is performed, and this routine is terminated.

Figure 15:
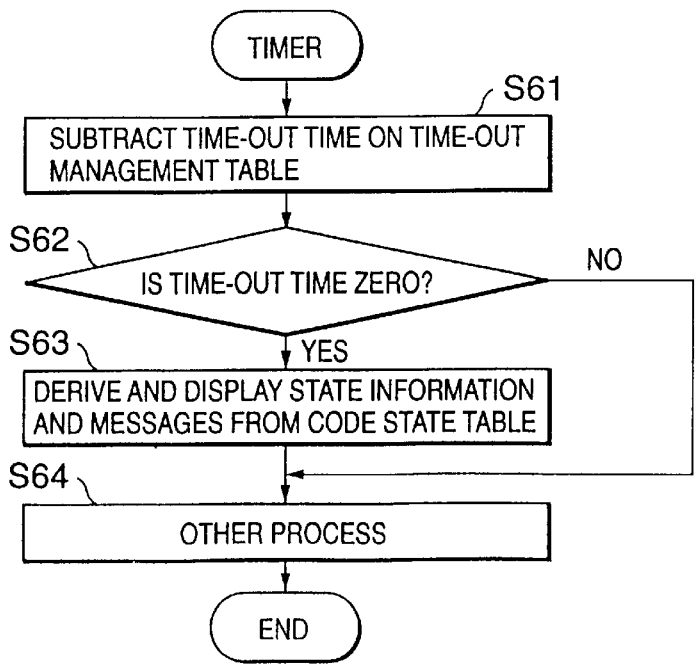
FIG. 15 is a flowchart of a timer processing routine in which a time-out time registered with a time-out management table is counted down, and when the remaining time reaches zero, the state of the destination user is displayed on one's own terminal.

FIG. 15 is a flowchart of a timer processing routine in which a time-out time registered with a time-out management table is counted down, and when the remaining time reaches zero, the state of the destination user is displayed on one's own terminal. The routine shown in FIG. 15 is repeatedly carried out at regular intervals by a timer interruption.

In a step S61, the time-out time on the time-out management table is subtracted, and the process goes to a step S62 in which it is determined whether the time-out time is zero. When it is decided that the time-out time is zero, it means that the other party of user makes no response for a predetermined time. Then the process goes to a step S63 in which state information of the other party of user and the final statement of the other party of user are derived from the user state table (cf. Table 2), and they are displayed, and then the process goes to a step S64. On the other hand, when it is decided that the time-out time is not zero, the process goes directly to the step S64 in which another necessary processing is performed, and this routine is terminated.

As mentioned above, according to the present invention, effective information is derived from messages, which simply flow according to the earlier technology, thereby contributing to useful utilization, and the present invention is more effective, particularly when it is applied to such a type of communication system that communication lines are always connected.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A communication apparatus connected via a network to at least one another communication apparatus, in which a character message transmitted from another communication apparatus is received and displayed, and a character message is inputted and transmitted to another communication apparatus, said communication apparatus comprising:

a user state storage unit for storing a user state list in which states of a user as an operator of the communication apparatus are associated with other communication apparatuses, respectively;

user state retrieval means for retrieving characters or a character train representative of a state of the user from the received character message; and user state registering means responsive to a detection of characters or a character train representative of a state of the user by said user state retrieval means for rewriting a state of the user on the user state list stored in said user state storage unit, the state of the user being associated with another communication apparatus as an originator who issues the character message, into the state of the user represented by the characters or the character train detected by a retrieval of said user state retrieval means.

2. A communication apparatus according to claim 1, further comprising:

taking one's seat confirmation retrieval means for retrieving whether a character message to be transmitted to another communication apparatus includes characters or a character train for confirming taking one's seat, the characters or the character message being useful to confirm that a user of said another communication apparatus is in a state of taking one's seat such that the user can operate said another communication apparatus; and communication destination state display means for displaying, when said taking one's seat confirmation retrieval means detects the characters or the character train for confirming taking one's seat in the character message to be transmitted to the another communication apparatus, a state of the user of the another communication apparatus in the user state list stored in said user state storage unit.

3. A communication apparatus according to claim 2, further comprising:

timer means for counting a time elapsed since a character message including characters or a character train for confirming taking one's seat is transmitted to another communication apparatus, wherein said communication destination state display means for displaying, when said communication apparatus does not yet receive a response message from said another communication apparatus at a time point that the time elapsed counted by said timer means reaches a predetermined waiting time, the state of the user of the another communication apparatus.

4. A communication apparatus according to claim 3, further comprising waiting time set up means for setting up said predetermined waiting time.

5. A communication apparatus according to claim 2, further comprising:

a final statement content storage unit for storing a final statement content list in which whole or part of character messages, each being finally transmitted from an associated another communication apparatus, are associated with other communication apparatuses, respectively; and final statement content registering means responsive to a reception of a character message for rewriting a character message on the final statement content list stored in said final statement content storage unit, the character message being associated with another communication apparatus as an originator who issues the character message, into whole or part of the newly received character message, wherein said communication destination state display means displays, when said taking one's seat confirmation retrieval means detects the characters or the character train for confirming taking one's seat in the character message to be transmitted to the another communication apparatus, a state of the user of the another communication apparatus in the user state list stored in said user state storage unit, and in addition the character message on the final statement content list stored in said final statement content storage unit, the character message being associated with said another communication apparatus.

6. A communication apparatus according to claim 1, further comprising a user state index character storage unit for storing characters or a character train representative of a state of the user in association with the state of the user, wherein said user state retrieval means retrieves characters or a character train, which are identical with the characters or the character train stored in said user state index character storage unit, from the received character message.

7. A communication apparatus according to claim 6, further comprising:

user state index character input means for inputting characters or a character train associated with states of the user; and user state index character registering means for registering the characters or the character train inputted through said user state index character input means on said user state index character storage unit in association with the state of the user.

8. A communication apparatus according to claim 1, further comprising user state list display means for displaying the user state list stored in said user state storage unit.

9. A communication apparatus according to claim 1, wherein said user state registering means serves, with respect to a predetermined first state of a plurality of types of states which may be registered on said user state list, to be responsive to receipt of a character message, but with omission of the retrieval of said user state retrieval means, and to rewrite a state of the user on the user state list stored in said user state storage unit, the state of the user being associated with another communication apparatus as an originator who issues the character message, into a predetermined second state different from the predetermined first state.

10. A communication apparatus according to claim 1, wherein in a case where as one of states of the user includes a movement state in which a user designates a place located apart from an installation place of a communication apparatus associated with the user, and the communication apparatus incorporates thereinto a bulletin board software for posting a notice of whereabouts of a plurality of users, the communication apparatus further comprises bulletin board rewriting means for registering with the bulletin board software, when said user state retrieval means retrieves characters or a character train representative of whereabouts from the received character message, whereabouts of another communication apparatus as an originator who issues the character message, which is indicated by the retrieved characters or the character train.

11. A communication apparatus connected via a network to at least one another communication apparatus, in which a character message transmitted from another communication apparatus is received and displayed, and a character message is inputted and transmitted to another communication apparatus, said communication apparatus comprising:

a final statement time storage unit for storing a final statement time list in which received times of character messages, each being finally transmitted from an associated another communication apparatus, are associated with other communication apparatuses, respectively;

received time obtaining means for obtaining received time of the character message transmitted from another communication apparatus; and final statement time registering means responsive to a reception of a character message for rewriting a time on the final statement time list stored in said final statement time storage unit, the time being associated with another communication apparatus as an originator who issues the character message, into the received time of the character message obtained by said received time obtaining means.

12. A communication apparatus according to claim 11, further comprising final statement time display means for displaying the final statement time list stored in said final statement time storage unit.

13. A communication apparatus according to claim 12, further comprising time elapsed arithmetic means for calculating times elapsed starting from times on the final statement time list stored in said final statement time storage unit up to present time, respectively, wherein said final statement time display means displays display columns for respective communication apparatuses on the final statement time list in accordance with a display format according to time elapsed starting from time displayed on the associated display column up to present time.

14. A communication apparatus connected via a network to at least one another communication apparatus, in which a character message transmitted from another communication apparatus is received and displayed, and a character message is inputted and transmitted to another communication apparatus, said communication apparatus comprising:

a final statement content storage unit for storing a final statement content list in which whole or part of character messages, each being finally transmitted from an associated another communication apparatus, are associated with other communication apparatuses, respectively; and final statement content registering means responsive to a reception of a character message for rewriting a character message on the final statement content list stored in said final statement content storage unit, the character message being associated with another communication apparatus as an originator who issues the character message, into whole or part of the newly received character message.

15. A communication apparatus according to claim 14, further comprising final statement content display means for displaying the final statement content list stored in said final statement content storage unit.

16. A communication program storage medium incorporated into a computer system connected via a network to at least one another communication apparatus, adapted to store therein a communication program for causing said computer system to operate as a communication apparatus in which a character message transmitted from another communication apparatus is received and displayed, and a character message is inputted and transmitted to another communication apparatus, said communication program storage medium storing a communication program comprising:

user state retrieval means for retrieving characters or a character train representative of a state of a user as an operator of the communication apparatus from the received character message; and user state registering means responsive to a detection of characters or a character train representative of a state of the user by said user state retrieval means for rewriting a state of the user on a user state list in which states of a user as an operator of the communication apparatus are associated with other communication apparatuses, respectively, the state of the user being associated with another communication apparatus as an originator who issues the character message, into the state of the user represented by the characters or the character train detected by a retrieval of said user state retrieval means; and user state list display means for displaying the user state list.

17. A communication program storage medium according to claim 16 wherein said user state registering means serves, with respect to a predetermined first state of a plurality of types of states which may be registered on the user state list, to be responsive to receipt of a character message, but with omission of the retrieval of said user state retrieval means, and to rewrite a state of the user on the user state list, the state of the user being associated with another communication apparatus as an originator who issues the character message, into a predetermined second state different from the predetermined first state.

18. A communication program storage medium incorporated into a computer system connected via a network to at least one another communication apparatus, adapted to store therein a communication program for causing said computer system to operate as a communication apparatus in which a character message transmitted from another communication apparatus is received and displayed, and a character message is inputted and transmitted to another communication apparatus, said communication program storage medium storing a communication program comprising:

received time obtaining means for obtaining received time of the character message transmitted from another communication apparatus;

final statement time registering means responsive to a reception of a character message for rewriting a time on a final statement time list in which received times of character messages, each being finally transmitted from an associated another communication apparatus, are associated with other communication apparatuses, respectively, the time being associated with another communication apparatus as an originator who issues the character message, into the received time of the character message obtained by said received time obtaining means; and final statement time display means for displaying the final statement time list.

19. A communication program storage medium incorporated into a computer system connected via a network to at least one another communication apparatus, adapted to store therein a communication program for causing said computer system to operate as a communication apparatus in which a character message transmitted from another communication apparatus is received and displayed, and a character message is inputted and transmitted to another communication apparatus, said communication program storage medium storing a communication program comprising:

final statement content registering means responsive to a reception of a character message for rewriting a character message on a final statement content list in which whole or part of character messages, each being finally transmitted from an associated another communication apparatus, are associated with other communication apparatuses, respectively, the character message being associated with another communication apparatus as an originator who issues the character message, into whole or part of the newly received character message; and final statement content display means for displaying the final statement content list.

* * * * *